(12) United States Patent
Ozawa (10) Patent No.: US 10,738,721 B2
(45) Date of Patent: Aug. 11, 2020

(54) BLOW-BY GAS SUPPLY DEVICE FOR ENGINE

(71) Applicant: SUBARU CORPORATION, Tokyo (JP)

(72) Inventor: Tomoya Ozawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 517 days.

(21) Appl. No.: 15/631,404

(22) Filed: Jun. 23, 2017

(65) Prior Publication Data

US 2018/0073451 A1    Mar. 15, 2018

(30) Foreign Application Priority Data

Sep. 9, 2016   (JP) .................................. 2016-176901

(51) Int. Cl.
*F02D 41/00* (2006.01)
*F02D 41/06* (2006.01)
(Continued)

(52) U.S. Cl.
CPC ......... *F02D 41/0007* (2013.01); *F01M 13/00* (2013.01); *F01N 3/225* (2013.01);
(Continued)

(58) Field of Classification Search
CPC ...... F01N 13/00; F01N 3/225; F02D 41/0007; F02B 37/16
See application file for complete search history.

(56) References Cited

U.S. PATENT DOCUMENTS 8,353,276 B2    1/2013  Lewis et al.
8,726,892 B2    5/2014  Lewis et al.
(Continued)

FOREIGN PATENT DOCUMENTS

CN      101629503 A    1/2010
CN     1103930656 A    7/2014
(Continued)

OTHER PUBLICATIONS

Machine generated translation of JP 2013096357 A.*
(Continued)

*Primary Examiner* — Ngoc T Nguyen
(74) *Attorney, Agent, or Firm* — Smith, Gambrell & Russell, LLP (57) ABSTRACT

A blow-by gas supply device includes an upstream-side passage, a downstream-side passage, a gas passage, a bypass passage, a valve mechanism, and a valve control unit. The device is provided in an engine including a compressor, and recirculates blow-by gas upstream of the compressor. The upstream-side passage is coupled to an input port of the compressor. The downstream-side passage is coupled to an output port of the compressor. The gas passage is coupled to the upstream-side passage and guides the blow-by gas from inside of the engine to the upstream-side passage. The bypass passage is coupled to the upstream-side passage and the downstream-side passage and guides the intake air from the downstream side passage to the upstream side passage. The valve mechanism is provided in the bypass passage and switched between communication and cutoff states. The valve control unit controls the valve mechanism in the communication or cutoff state.

16 Claims, 9 Drawing Sheets

(51) Int. Cl.
*F02B 37/16* (2006.01)
*F01M 13/00* (2006.01)
*F02M 25/06* (2016.01)
*F02M 25/08* (2006.01)
*F01N 3/22* (2006.01)
*F02D 13/02* (2006.01)
*F02D 41/02* (2006.01)

(52) U.S. Cl.
CPC .......... *F02B 37/16* (2013.01); *F02D 13/0203* (2013.01); *F02D 41/024* (2013.01); *F02D 41/062* (2013.01); *F02M 25/06* (2013.01); *F02M 25/08* (2013.01); F02D 41/06 (2013.01); F02D 2200/0414 (2013.01); F02D 2200/70 (2013.01); F02D 2250/08 (2013.01); Y02T 10/144 (2013.01)

(56) References Cited

U.S. PATENT DOCUMENTS

| | | |
|---|---|---|
| 9,260,991 B2 | 2/2016 | Lewis et al. |
| 9,447,753 B2 | 9/2016 | Kuribayashi et al. |
| 9,695,780 B2 | 7/2017 | Sadamitsu et al. |
| 2008/0110443 A1* | 5/2008 | Hirano ................ F01M 13/021 123/572 |
| 2017/0122194 A1* | 5/2017 | Nishio .................... F02B 37/16 |

FOREIGN PATENT DOCUMENTS

| | | |
|---|---|---|
| CN | 1104204432 B | 8/2016 |
| EP | 2 733 320 A1 | 5/2014 |
| JP | S58-059348 A | 4/1983 |
| JP | S63-10463 | 1/1988 |
| JP | 2013-096357 | 5/2013 |

OTHER PUBLICATIONS

Japanese Office Action dated Apr. 3, 2018, in Japanese Patent Application No. 2016-176901 (3 pages with English translation).
Office Action received in Chinese Patent Application No. 201710441813.8 dated Jan. 25, 2019 (7 pages in Chinese with machine translation).

* cited by examiner

BLOW-BY GAS SUPPLY DEVICE FOR ENGINE

CROSS-REFERENCE TO RELATED APPLICATIONS

The present application claims priority from Japanese Patent Application No. 2016-176901 filed on Sep. 9, 2016, the entire contents of which are hereby incorporated by reference.

BACKGROUND

1. Technical Field

The present invention relates to a blow-by gas supply device for an engine, the blow-by gas supply device recirculating blow-by gas to an upstream side of a compressor.

2. Related Art

Blow-by gas flows from a combustion chamber into a crank chamber of an engine through a clearance between a cylinder and a piston. In addition, the crank chamber and an inlet system are coupled to each other via a pipe that guides the blow-by gas. In this way, the blow-by gas can be recirculated from the crank chamber into the inlet system. Thus, the blow-by gas can be returned to and combusted in the combustion chamber. Meanwhile, an engine including a turbocharger, that is, an engine including a compressor that compresses intake air and supplies the compressed air to the inlet system has been developed (see Japanese Unexamined Patent Application Publication (JP-A) No. S58-059348). In the engine including this compressor, intake pipe pressure on a downstream side of the compressor is increased. Thus, the blow-by gas needs to be supplied to an intake pipe on an upstream side of the compressor.

As described above, in the engine including the compressor, the blow-by gas is supplied to the intake pipe on the upstream side of the compressor, and this blow-by gas contains moisture. Accordingly, when an external temperature is below a freezing point, the moisture in the blow-by gas is frozen by the intake air, and the compressor possibly suctions ice. Suctioning of the ice by the compressor, just as described, can be a cause of damage to the compressor. Thus, it has been desired to inhibit freezing of the moisture that is contained in the blow-by gas.

SUMMARY OF THE INVENTION

It is desirable to inhibit freezing of moisture contained in blow-by gas.

An aspect of the present invention provides a blow-by gas supply device for an engine. The engine includes a compressor that is configured to compress intake air. The blow-by gas supply device is configured to be provided in the engine and to recirculate blow-by gas to an upstream side of the compressor. The blow-by gas supply device includes: an upstream side passage that is configured to be coupled to an input port of the compressor and guide the intake air to be suctioned into the input port; a downstream-side passage that is configured to be coupled to an output port of the compressor and guide the intake air discharged from the output port; a gas passage that is coupled to the upstream-side passage and configured to guide the blow-by gas from inside of the engine to the upstream-side passage; a bypass passage that is coupled to the upstream side passage and the downstream side passage and configured to guide the intake air from the downstream side passage to the upstream side passage; a valve mechanism that is provided in the bypass passage and configured to be switched between a communication state where the intake air is guided from the downstream-side passage to the upstream-side passage and a cutoff state where the intake air flowing from the downstream-side passage to the upstream-side passage is cut off; and a valve control unit that is configured to control the valve mechanism in the communication state when an external temperature is equal to or lower than a freezing point, and control the valve mechanism in the cutoff state when the external temperature exceeds the freezing point.

DETAILED DESCRIPTION

Figure 1:
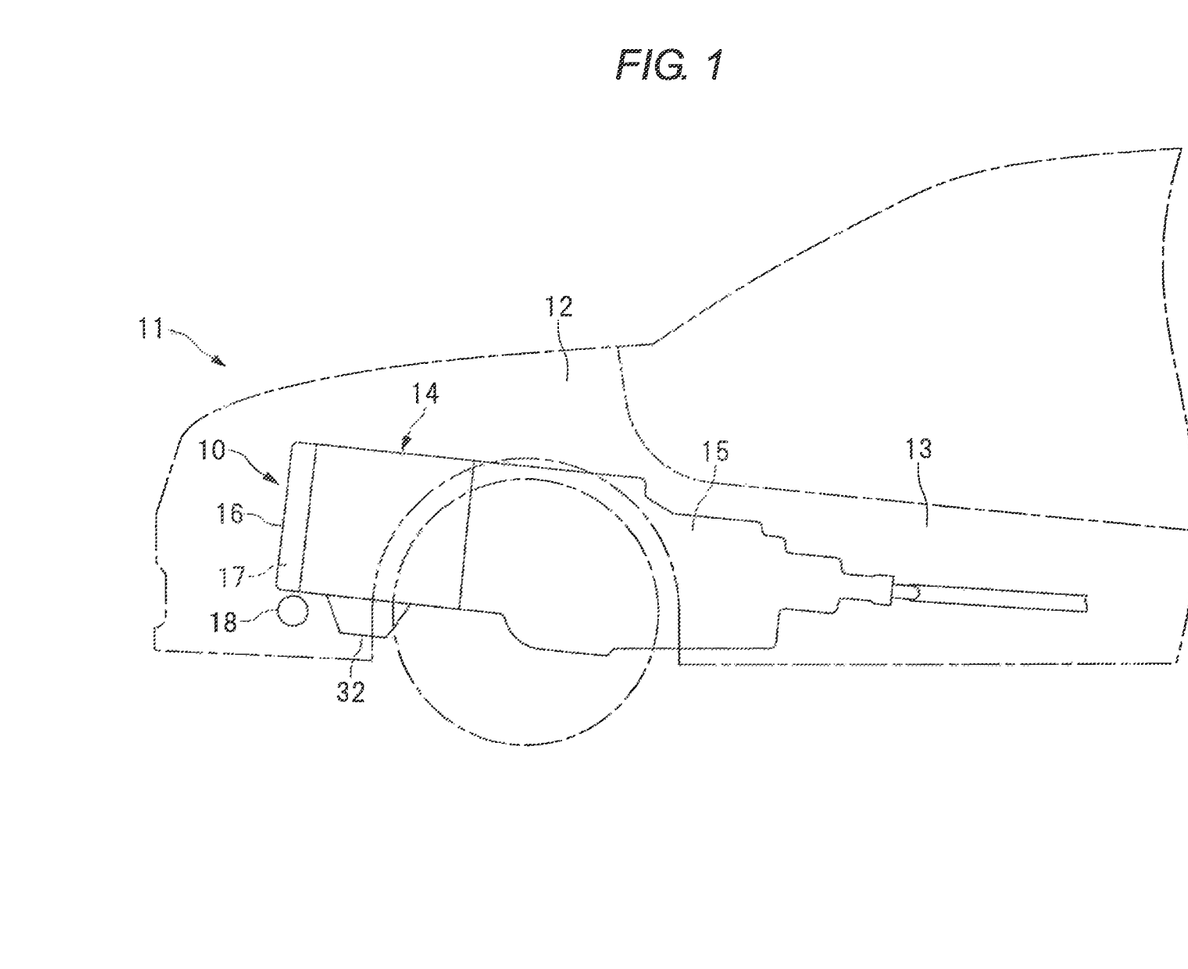
FIG. 1 is a schematic view illustrating an example of a power unit that is mounted on a vehicle.

A detailed description will hereinafter be made on an example of the present invention on the basis of the drawings. FIG. 1 is a schematic view illustrating an example of a power unit 10 that is mounted on a vehicle. As illustrated in FIG. 1, the power unit 10 that is mounted on a vehicle body 11 is vertically disposed from an engine room 12 to a floor tunnel 13. The power unit 10 has an engine 14 and a transmission 15 coupled thereto. A chain cover 16 that covers an unillustrated timing chain and the like is attached to a front portion of the engine 14. A chain chamber 17 defined by this chain cover 16 is a space that constitutes inside of the engine 14 and is also a space that communicates with a crank chamber 65 in cylinder blocks 20, 21, which will be described below. In addition, a turbocharger 18 as a supercharger is installed below the engine 14.

Figure 2:
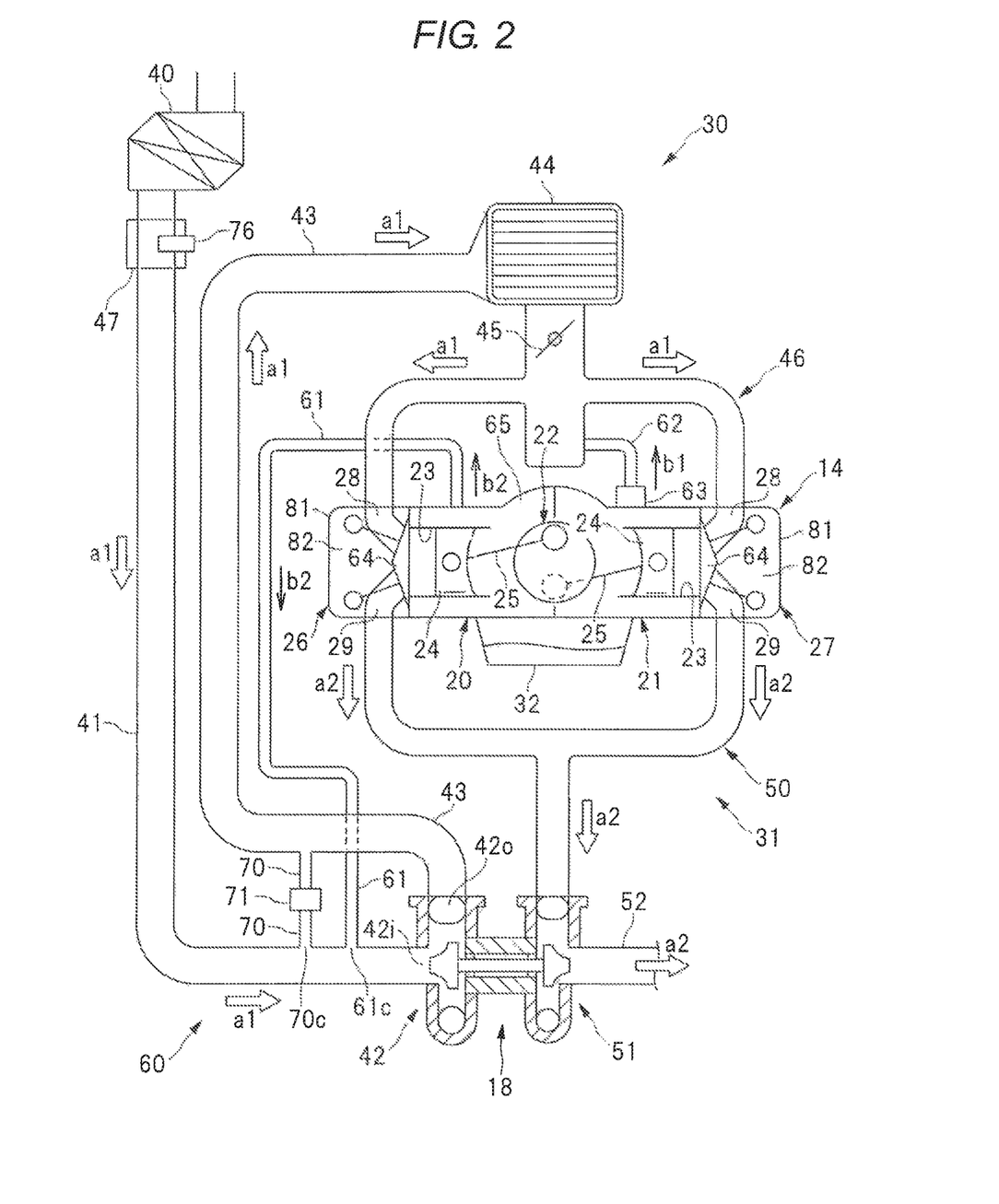
FIG. 2 is a schematic view illustrating a configuration of an engine.

FIG. 2 is a schematic view illustrating a configuration of the engine 14. As illustrated in FIG. 2, the engine 14 has: the cylinder block 20 that constitutes one cylinder bank; the cylinder block 21 that constitutes the other cylinder bank; and a crankshaft 22 that is supported by a pair of the cylinder blocks 20, 21. The cylinder blocks 20, 21 each include a cylinder bore 23, and a piston 24 is housed in the cylinder bore 23. The crankshaft 22 and the piston 24 are coupled via a connecting rod 25.

Cylinder heads 26, 27, each of which includes a valve driving mechanism, are respectively attached to the cylinder blocks 20, 21. The cylinder heads 26, 27 each include an intake port 28 and an exhaust port 29. An inlet system 30 is coupled to the intake port 28 of each of the cylinder heads 26, 27, and an exhaust system 31 is coupled to the exhaust port 29 of each of the cylinder heads 26, 27. An oil pan 32 that stores oil is attached to lower portions of the cylinder blocks 20, 21.

The inlet system 30 is configured by including an air cleaner box 40, a first intake duct 41, a compressor 42, a second intake duct 43, an intercooler 44, a throttle valve 45, an intake manifold 46, and the like. As indicated by arrows a1, in FIG. 2, intake air that has flowed through the air cleaner box 40 flows through the first intake duct 41, the compressor 42, the second intake duct 43, the intercooler 44, the throttle valve 45, and the intake manifold 46 and is then supplied to the intake port 28 of each of the cylinder heads 26, 27. An airflow meter 47 that detects a flow rate of the intake air is provided in the first intake duct 41.

The exhaust system 31 is configured by including an exhaust manifold 50, a turbine 51, an exhaust pipe 52, and the like. As indicated by arrows a2 in FIG. 2, exhaust gas that has been discharged from the exhaust ports 29 flows through the exhaust manifold 50, the turbine 51, and the exhaust pipe 52 and is then discharged to outside. Note that a catalytic converter and silencer, which are not illustrated, are coupled to the exhaust pipe 52, and the exhaust gas is discharged to the outside through the catalytic converter and the silencer.

[Blow-by Gas Supply Device]

Figure 3:
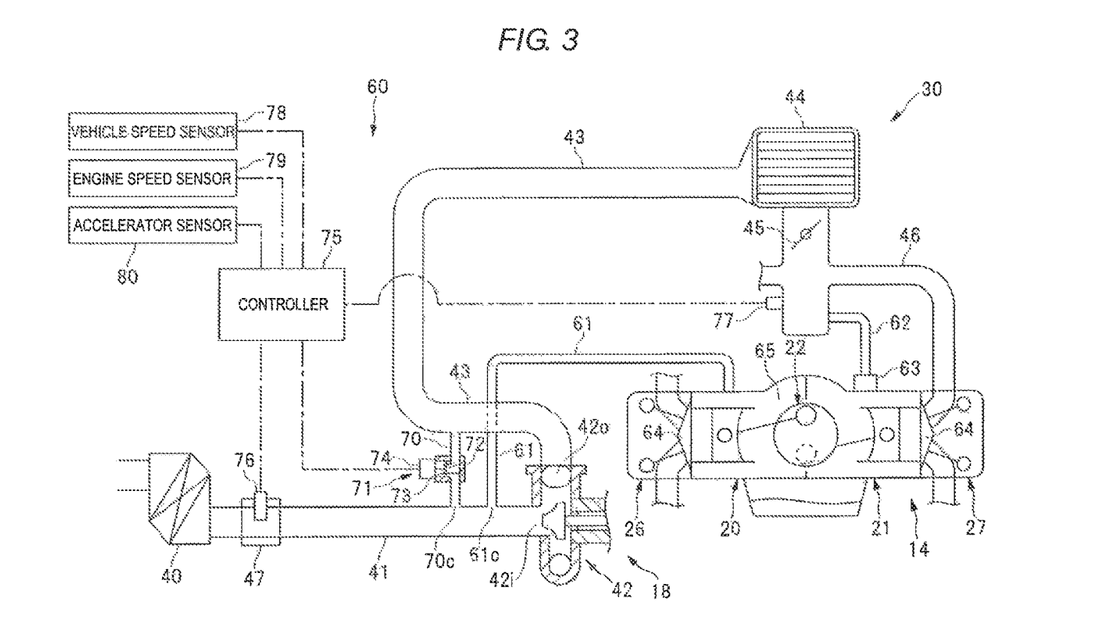
FIG. 3 is a schematic view illustrating a blow-by gas supply device for the engine according to an example of the present invention.

A description will be made on a blow-by gas supply device 60 for the engine 14 as the one example of the present invention. FIG. 3 is a schematic view illustrating the blow-by gas supply device 60 as the one example of the present invention. Note that, in FIG. 3, the same components as the components illustrated in FIG. 2 are denoted by the same reference signs and descriptions thereon will not be made.

As illustrated in FIG. 3, the engine 14 is provided with the blow-by gas supply device 60 that recirculates blow-by gas to the inlet system 30 for re-combustion. The blow-by gas supply device 60 includes: a first blow-by pipe 61 that couples the chain cover 16 and the first intake duct 41; and a second blow-by pipe 62 that couples the cylinder block 21 and the intake manifold 46. In addition, the second blow-by pipe 62 is provided with a PCV valve 63 that adjusts a passage area. In one example, the first blow-by pipe 61 may serve as a "gas passage". Note that PCV stands for "positive crankcase ventilation". The blow-by gas that is leaked into the crank chamber 65 from a combustion chamber 64 of the engine 14 is supplied to the inlet system 30 via the first blow-by pipe 61 or the second blow-by pipe 62.

For instance, in the case where a throttle opening degree is small, internal pressure of the intake manifold 46 is reduced to become negative pressure. Accordingly, as indicated by an arrow b1 in FIG. 2, the blow-by gas that is leaked into the crank chamber 65 is supplied to the intake manifold 46 through the PCV valve 63 and the second blow-by pipe 62. At this time, some of air flowing through the first intake duct 41 is supplied to the chain chamber 17 through the first blow-by pipe 61. On the other hand, in the cases where the throttle opening degree is large and the intake air is supercharged by the compressor 42, the internal pressure of the intake manifold 46 is increased to become positive pressure, and the PCV valve 63 is closed. At this time, due to pressure balance between the crank chamber 65 and the first intake duct 41, as indicated by arrows b2 in FIG. 2, the blow-by gas is supplied to the first intake duct 41 through the first blow-by pipe 61. By using this blow-by gas supply device 60, the blow-by gas can be supplied to the combustion chamber 64 of the engine 14, and the blow-by gas can thereby be combusted.

As illustrated in FIG. 3, the first intake duct 41 that guides the intake air to be suctioned into an input port 42$i$ of the compressor 42 is coupled to the input port 42$i$. In one example, the first intake duct 41 may serve as an "upstream side passage". In addition, the second intake duct 43 that guides the intake air discharged from an output port 42$o$ of the compressor 42 is coupled to the output port 42$o$. In one example, the second intake duct 43 may serve as a "downstream side passage". Furthermore, the first intake duct 41 and the second intake duct 43 are coupled via a bypass nine 70. In one example, bypass pipe 70 may serve as a "bypass passage". The bypass pipe 70 that bypasses the compressor 42 is provided with an air-bypass valve 71 as an electromagnetic control valve. In one example, the air-bypass valve may serve as a "valve mechanism". Note that the air-bypass valve 71 has: a valve body 73 that opens/closes a communication port 72; and a solenoid 74 that moves the valve body 73.

The air-bypass valve 71 is switched between a communication state where the valve body 73 is moved to open the communication port 72 and a cutoff state where the valve body 73 is moved to cut off the communication port 72. When the air-bypass valve 71 is controlled in the communication state, the intake air can be guided from the second intake duct 43 to the first intake duct 41. On the other hand, when the air-bypass valve 71 is controlled in the cutoff state, the intake air that flows from the second intake duct 43 toward the first intake duct 41 can be cut off. In addition, when the air-bypass valve 71 is controlled in the communication state, a communication amount, that is, an opening degree of the air-bypass valve 71 can be adjusted in a continuous or stepwise manner. By adjusting the opening degree of the air-bypass valve 71, just as described, a flow rate (hereinafter described as a recirculation rate) of the intake air that is returned from the second intake duct 43 to the first intake duct 41 can be adjusted.

In order to control the air-bypass valve 71, the blow-by gas supply device 60 is provided with a controller 75 that is constructed of a computer and the like. In one example, the controller 75 may serve as a "valve control unit". Various sensors are coupled to the controller 75, and the various sensors include: a first temperature sensor 76 that is provided in the airflow meter 47; a second temperature sensor 77 that is provided in the intake manifold 46; a vehicle speed sensor 78 that detects a travel speed of the vehicle; an engine speed sensor 79 that detects an engine speed; an accelerator sensor 80 that detects an operation amount of an accelerator pedal by a driver; and the like. The controller 75 controls the opening degree of the air-bypass valve 71 on the basis of various signals transmitted from the various sensors. Note that the first temperature sensor 76 is a temperature sensor that detects a temperature of the intake air suctioned into the first intake duct 41 (hereinafter described as an external temperature). The second temperature sensor 77 is a temperature sensor that detects a temperature of the intake air that is suctioned into the intake manifold 46 (hereinafter described as an intake manifold temperature).

[Air-Bypass Control (Overview)]

As described above, when the intake air is supercharged by the compressor 42, the internal pressure of the intake manifold 46 is increased. Thus, the blow-by gas is supplied from the first blow-by pipe 61 to the first intake duct 41. The blow-by gas is supplied to an upstream side of the compressor 42, just as described. However, because this blow-by gas contains moisture, it has been desired to inhibit freezing of the moisture that is contained in the blow-by gas. More specifically, when the moisture in the blow-by gas is frozen, ice is possibly suctioned into the compressor 42 and possibly damages the compressor 42. Thus, it has been desired to inhibit formation of the ice on the upstream side of the compressor 42. In view of the above, in order to inhibit freezing of the moisture that is contained in the blow-by gas, the controller 75 executes air-bypass control to control the opening degree of the air-bypass valve 71.

Figure 4A:
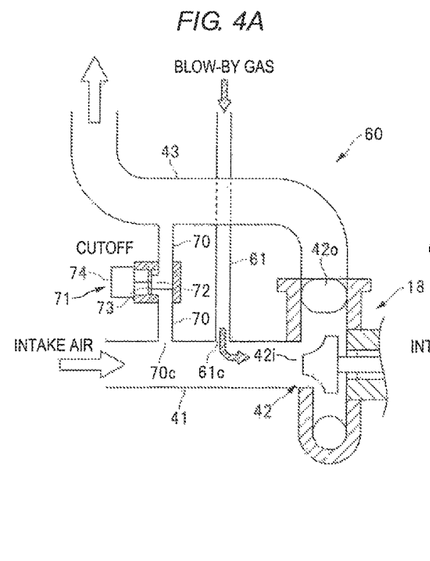
FIG. 4A is a view illustrating a flow of intake air at a time when an air-bypass valve is controlled in a cutoff state.
Figure 4B:
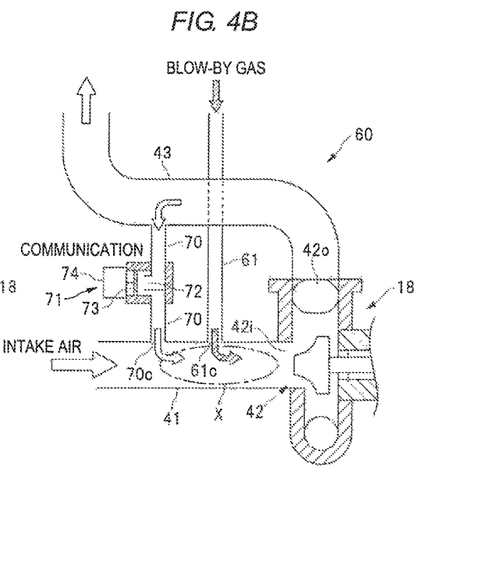
FIG. 4B is a view illustrating a flow of the intake air at a time when the air-bypass valve is controlled in a communication state.

FIG. 4A is a view illustrating a flow of the intake air at a time when the air-bypass valve 71 is controlled in the cutoff state, and FIG. 4B is a view illustrating a flow of the intake air at a time when the air-bypass valve 71 is controlled in the communication state. As illustrated in FIG. 4A, for instance, under such a circumstance that the external temperature, that is, the temperature of the intake air exceeds 0° C., the moisture in the blow-by gas is not frozen in the first intake duct 41. Thus, the air-bypass valve 71 is controlled in the cutoff state. On the other hand, as illustrated in FIG. 4B, for instance, under such a circumstance that the external temperature, that is, the temperature of the intake air is equal to or lower than 0° C., the moisture in the blow-by gas is possibly frozen in the first intake duct 41. Thus, the air-bypass valve 71 is controlled in the communication state.

When the air-bypass valve 71 is controlled in the communication state, just as described, some of the intake air can be returned from the second intake duct 43 to the first intake duct 41 via the bypass pipe 70. More specifically, the intake air that flows through the second intake duct 43 is intake air that has adiabatically been compressed by the compressor 42, and thus is the air at a higher temperature than the intake air flowing through the first intake duct 41. For this reason, as indicated in a range X in FIG. 4B, the intake air that flows into the input port 42i of the compressor 42 can be warmed by recirculating the high-temperature intake air from the second intake duct 43 to the first intake duct 41.

In this way, the temperature of the intake air, into which the blow-by gas flows, can be maintained to be higher than 0° C. as a freezing point. Thus, freezing of the moisture that is contained in the blow-by gas can be prevented, and the damage to the compressor 42, which is associated with suctioning of the ice, can be prevented. In addition, as illustrated in FIG. 4B, the first blow-by pipe 61 is coupled to a portion of the first intake duct 41 on a downstream side of a coupled position 70c of the bypass pipe 70. More specifically, a coupled position 61c of the first blow-by pipe 61 to the first intake duct 41 is provided to be closer to the input port 42i than the coupled position 70c of the bypass pipe 70 to the first intake duct 41. In this way, before the blow-by gas flows into the intake air, the intake air, into which the blow-by gas flows, can be warmed in advance. Thus, freezing of the moisture in the blow-by gas can effectively be inhibited.

[Air-Bypass Control (Flowchart)]

Figure 5:
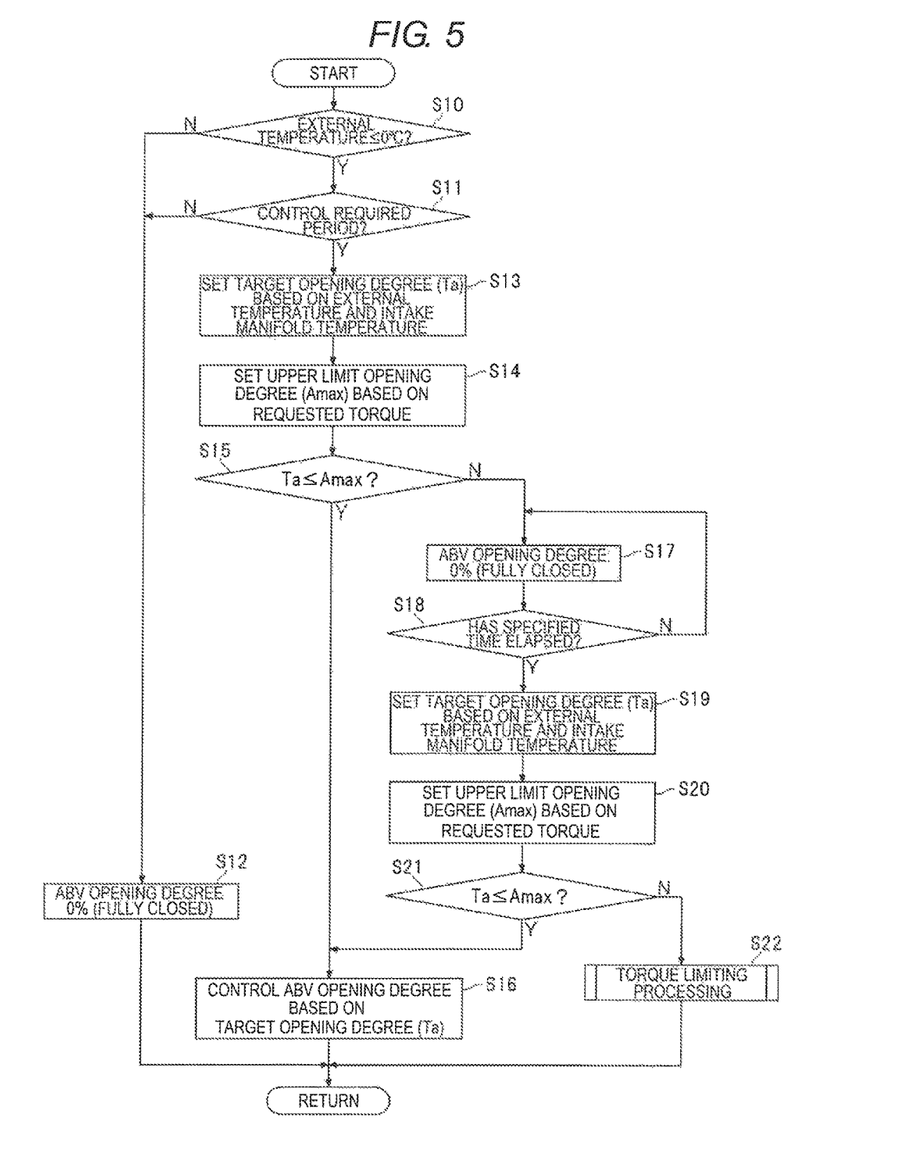
FIG. 5 is a flowchart illustrating an example of an execution procedure of air-bypass control.
Figure 6:
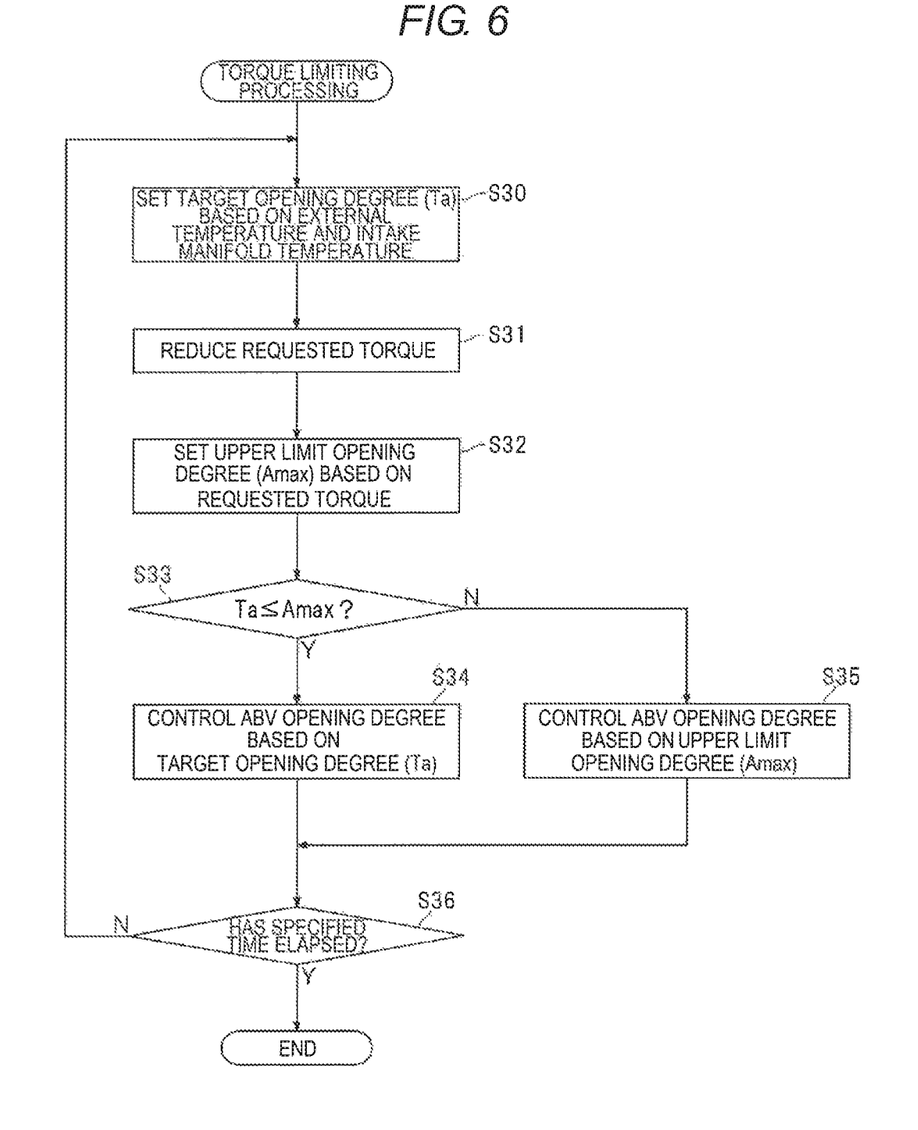
FIG. 6 is a flowchart illustrating the example of the execution procedure of the air-bypass control.

A description will hereinafter be made on an execution procedure of the air-bypass control by following flowcharts. FIG. 5 and FIG. 6 are flowcharts illustrating an example of the execution procedure of the air-bypass control. Note that the air-bypass valve 71 is abbreviated as "ABV" in FIG. 5 and FIG. 6.

Figure 7:
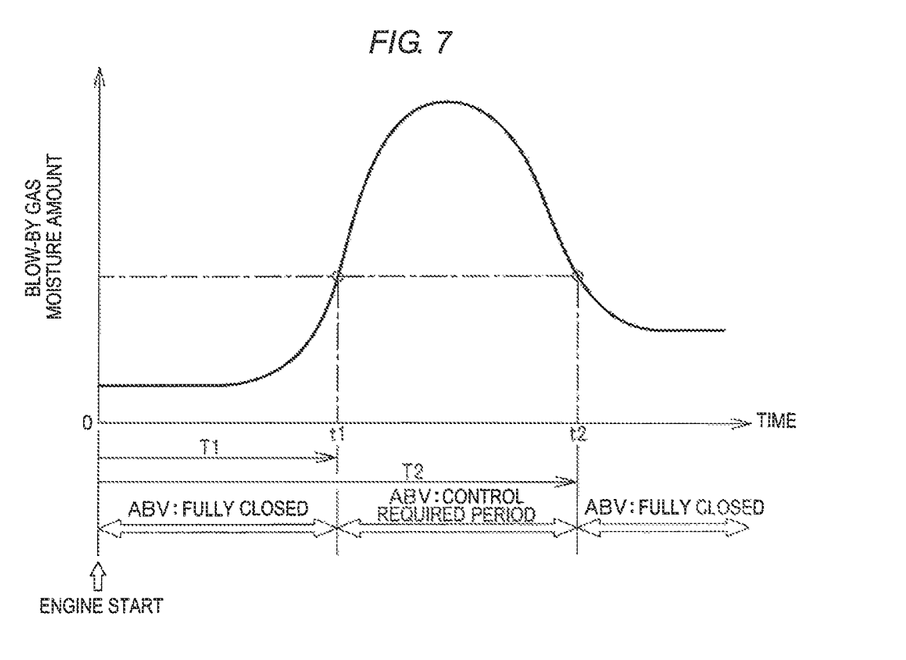
FIG. 7 is a chart illustrating an example of a control required period of the air-bypass valve.

As illustrated in FIG. 5, in Step S10, it is determined whether the external temperature is equal to or lower than 0° C. (the freezing point). If the external temperature is equal to or lower than 0° C., the moisture in the blow-by gas is possibly frozen. Thus, the process proceeds to step S11, and it is determined whether it is currently in a control required period of the air-bypass valve 71. Here, FIG. 7 is a chart illustrating an example of the control required period of the air-bypass valve 71. As illustrated in FIG. 7, the control required period of the air-bypass valve 71 is a specified period (time t1 to t2) after an engine start and is a period in which an amount of the moisture contained in the blow-by gas is increased. As illustrated in FIG. 5, if it is determined in step S11 that it is currently not in the control required period of the air-bypass valve 71, the amount of the moisture in the blow-by gas is small. Thus, the process proceeds to step S12, the opening degree of the air-bypass valve 71 is controlled to 0%, and the air-bypass valve 71 is fully closed, that is, controlled in the cutoff state. Note that if the external temperature exceeds 0° C. in step S10, there is no possibility that the moisture in the blow-by gas is frozen. Thus, similarly, the process proceeds to step S12, and the air-bypass valve 71 is controlled in the cutoff state.

As illustrated in FIG. 7, from a start of the engine 14 to the time t1, that is, from the start of the engine 14 to a lapse of a first period T1, an oil temperature of the engine 14 and the like are not sufficiently increased. Thus, a situation where an evaporated amount of condensed water in the crank chamber 65 is small and the amount of the moisture contained in the blow-by gas is small occurs. In addition, a situation where the time t1 is passed after the start of the engine 14 corresponds to a situation where the evaporated amount of the condensed water is increased due to increases in the oil temperature of the engine 14 and the like, and thus the amount of the moisture contained in the blow-by gas is also increased. Furthermore, a situation where the time t2 is passed after the start of the engine 14, that is, a situation where a second period T2, which is longer than the first period T1, has elapsed since the start of the engine 14 corresponds to a situation where the amount of the condensed water itself is reduced due to the evaporation and thus the amount of the moisture contained in the blow-by gas is also reduced. Just as described, in the control required period of the air-bypass valve 71, the amount of the moisture contained in the blow-by gas is increased. Thus, the air-bypass valve 71 is controlled in the communication state so as to prevent freezing of the moisture in the blow-by gas.

Figure 8:
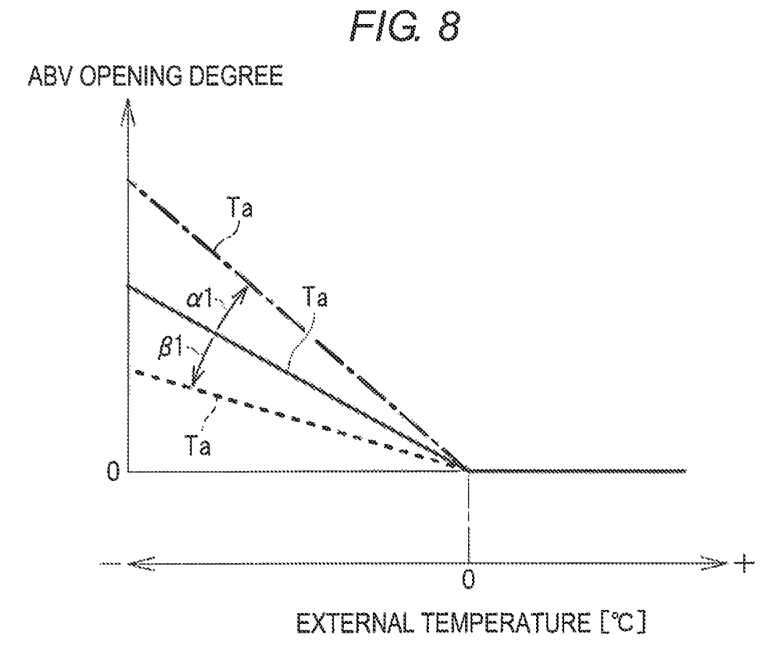
FIG. 8 is a chart illustrating an example of a target opening degree of the air-bypass valve.

As illustrated in FIG. 5, if it is determined that the external temperature is equal to or lower than 0° C. and that it is currently in the control required period of the air-bypass valve 71, the process proceeds to step S13. Then, a target opening degree Ta of the air-bypass valve 71 is set on the basis of the external temperature and the intake manifold temperature. Here, FIG. 8 is a chart illustrating an example of the target opening degree Ta of the air-bypass valve 71. As illustrated in FIG. 8, in the case where the external temperature is equal to or lower than 0° C., the target opening degree Ta is set to be increased as the external temperature is reduced. In addition, as indicated by an arrow α1 in FIG. 8, the target opening degree Ta is set to be increased as the intake manifold temperature is reduced. On the other hand, as indicated by an arrow β1, the target opening degree Ta is set to be reduced as the intake manifold temperature is increased.

More specifically, in the case where the temperature of the intake air that flows from the air cleaner box 40 into the first intake duct 41 is low, it is difficult to increase the temperature of the intake air flowing through the first intake duct 41 to 0° C. or higher. Thus, the recirculation rate of the intake air has to be increased. Similarly, in the case where the temperature of the intake air that is returned from the second intake duct 43 to the first intake duct 41 is low, it is difficult to increase the temperature of the intake air flowing through the first intake duct 41 to 0° C., or higher. Thus, the recirculation rate of the intake air has to be increased. For this reason, as the external temperature is reduced, the opening degree, that is, the communication amount of the air-bypass valve 71 is increased. As the intake manifold temperature is reduced, the opening degree, that is, the communication amount of the air-bypass valve 71 is increased.

Note that, in the above description, the temperature of the intake air that has adiabatically been compressed by the compressor 42, that is, the temperature of the intake air flowing through the second intake duct 43 is estimated on the basis of the intake manifold temperature, that is, the temperature of the intake air flowing through the intake manifold 46. However, the present invention is not limited thereto. For instance, a temperature sensor may be provided in the second intake duct 43 to directly detect the temperature of the intake air, and the target opening degree Ta may be set on the basis of this intake air temperature. Alternatively, the temperature of the intake air that has adiabatically been compressed by the compressor 42 may be estimated on the basis of the engine speed, the intake manifold internal pressure, and the like, and the target opening degree Ta may be set on the basis of this intake air temperature.

Figure 9:
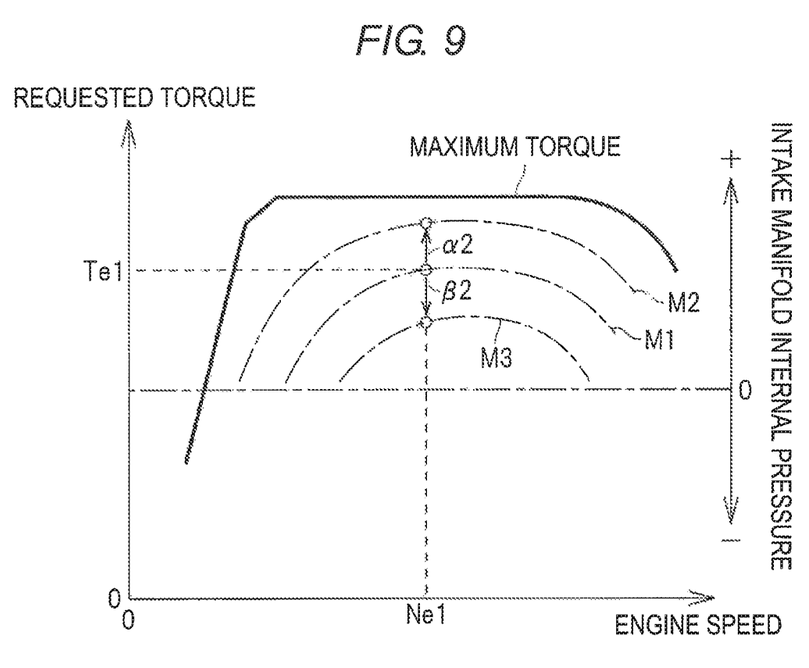
FIG. 9 is a chart illustrating an example of an upper limit opening degree of the air-bypass valve.

As illustrated in FIG. 5, in step S14, an upper limit opening degree Amax of the air-bypass valve 71 is set on the basis of requested torque by the driver. Here, FIG. 9 is a chart illustrating an example of the upper limit opening degree Amax of the air-bypass valve 71. As illustrated in FIG. 9, the upper limit opening degree Amax of the air-bypass valve 71 is set on the basis of the requested torque and the engine speed. More specifically, in the case where the opening degree of the air-bypass valve 71 is increased, the recirculation rate of the intake air is increased, supercharging pressure is reduced, and thus engine torque is reduced. For this reason, the upper limit opening degree Amax is set for the air-bypass valve 71 from a perspective of securing the requested torque by the driver. As illustrated in FIG. 9, in the cases where the engine speed is Ne1 and the requested torque is Te1, an upper limit opening degree M1 (for instance, 60%) is set as the upper limit opening degree Amax of the air-bypass valve 71. In addition, as indicated by an arrow α2 in FIG. 9, in the case where the requested torque is increased due to an increase in an accelerator opening degree or the like, a smaller upper limit opening degree M2 (for instance, 40%) than the upper limit opening degree M1 is set as the upper limit opening degree Amax of the air-bypass valve 71. On the other hand, as indicated by an arrow β2 in FIG. 9, in the case where the requested torque is reduced due to a reduction in the accelerator opening degree or the like, a larger upper limit opening degree M3 (for instance, 80%) than the upper limit opening degree M1 is set as the upper limit opening degree Amax of the air-bypass valve 71. Note that the controller 75 has a function of calculating the requested torque by the driver on the basis of the vehicle speed, the accelerator opening degree, and the like.

As illustrated in FIG. 5, in step S15, it is determined whether the target opening degree Ta of the air-bypass valve 71 is equal to or smaller than the upper limit opening degree Amax. If it is determined in step S15 that the target opening degree Ta is equal to or smaller than the upper limit opening degree Amax, the requested torque can be obtained even with the recirculation of the intake air. Thus, the process proceeds to step S16, and the opening degrees of the air-bypass valve 71 is controlled on the basis of the target opening degree Ta. On the other hand, if it is determined in step S15 that the target opening degree Ta is larger than the upper limit opening degree Amax, the requested torque becomes insufficient due to the recirculation of the intake air. Thus, the process proceeds to step S17, and the air-bypass valve 71 is controlled in the cutoff state. Next, in Step S18, it is determined whether a specified time has elapsed since cutting off of the air-bypass valve 71. If the specified time has not elapsed since cutting off of the air-bypass valve 71 in step S18, the cutoff state of the air-bypass valve 71 continues. In the case where the requested torque possibly becomes insufficient, just as described, the air-bypass valve 71 is cut off for the specified time. Thus, the engine torque can sufficiently be increased, and drivability of the vehicle can be improved. Note that, in the case where cutting off of the air-bypass valve 71 continues, the moisture in the blow-by gas is possibly frozen. Thus, the specified time, during which cutting off of the air-bypass valve 71 is permitted, is set to a time during which ice is not formed on the basis of an experiment, a simulation, or the like.

If it is determined in step S18 that the specified time has elapsed since cutting off of the air-bypass valve 71, the process proceeds to step S19, and the target opening degree Ta of the air-bypass valve 71 is set. Then, the process proceeds to step S20, and the upper limit opening degree Amax of the air-bypass valve 71 is set. If it is determined in following step S21 that the target opening degree Ta is equal to or smaller than the upper limit opening degree Amax, that is, if depression of the accelerator pedal or the like is canceled and the requested torque is reduced, the process proceeds to step S16, and the opening degree of the air-bypass valve 71 is controlled on the basis of the target opening degree Ta. On the other hand, if it is determined in step S21 that the target opening degree Ta exceeds the upper limit opening degree Amax, that is, the depression of the accelerator pedal or the like continues and the requested torque is maintained, the process proceeds to step S22, and torque limiting processing to forcibly reduce the requested torque is executed, so as to inhibit freezing of the moisture contained in the blow-by gas.

Next, a description will be made on an execution procedure of the torque limiting processing. In the torque limiting processing to reduce the requested torque, in step S30, the target opening degree Ta of the air-bypass valve 71 is set. In step S31, the requested torque is reduced by subtracting specified torque from the requested torque. In following step S32, the upper limit opening degree Amax of the air-bypass valve 71 is set on the basis of the reduced requested torque. Then, if it is determined in step S33 that the target opening degree Ta is equal to or smaller than the upper limit opening degree Amax, the process proceeds to step S34, and the opening degree of the air-bypass valve 71 is controlled on the basis of the target opening degree Ta. On the other hand, if it is determined in step S33 that the target opening degree Ta exceeds the upper limit opening degree Amax, the process proceeds to step S35, and the opening degree of the air-bypass valve 71 is controlled on the basis of the upper limit opening degree Amax. When the opening degree of the air-bypass valve 71 is controlled on the basis of the target opening degree Ta or the upper limit opening degree Amax, just as described, the process proceeds to step S36, and it is determined whether a specified time has elapsed since initiation of the torque limiting processing. If it is determined in step S36 that the specified time has not elapsed, the process returns to step S30, and the above-described torque limiting processing continues. On the other hand, if it is determined in step S36 that the specified time has elapsed, the torque limiting processing is terminated, and the process exits the routine.

As it has been described so far, when the external temperature is equal to or lower than 0° C., the air-bypass valve 71 is controlled in the communication state. On the other hand, when the external temperature exceeds 0° C., the air-bypass valve 71 is controlled in the cutoff state. In this way, the intake air, into which the blow-by gas flows, can be warmed, and thus freezing of the moisture contained in the blow-by gas can be prevented. In addition, in the case where it is currently not the control required period of the air-bypass valve 71, the air-bypass valve 71 is controlled in the cutoff state even when the external temperature is equal to or lower than 0° C. That is, from the start of the engine 14 to the lapse of the first period T1, the air-bypass valve 71 is controlled in the cutoff state even when the external temperature is equal to or lower than 0° C. in addition, after the second period T2 elapses from the start of the engine 14, the air-bypass valve 71 is controlled in the cutoff state even when the external temperature is equal to or lower than 0° C. In this way, in the case where the amount of the moisture contained in the blow-by gas is small, the air-bypass valve 71 is controlled in the cutoff state. Thus, the engine torque can be increased, and the drivability of the vehicle can be improved.

It is needless to say that the present invention is not limited to the example and various modifications can be made thereto within the scope that does not depart from the gist thereof. In the above description, the air-bypass valve 71 whose opening degree can be adjusted in the continuous or stepwise manner is used as the valve mechanism. However, the present invention is not limited thereto. As the valve mechanism, any valve mechanism can be adopted as long as the communication state and the cutoff state thereof can be switched. In addition, in the above description, the target opening degree Ta is set on the basis of the external temperature, that is, the intake air temperature in the first intake duct 41, and the target opening degree Ta is set on the basis of the intake manifold temperature, that is, the intake air temperature in the second intake duct 43. However, the present invention is not limited thereto. For instance, the target opening degree Ta may be set only on the basis of the temperature of the intake air that flows through the first intake duct 41. Alternatively, the target opening degree Ta may be set only on the basis of the temperature of the intake air that flows through the second intake duct 43. Furthermore, whether it is currently in the control required period is determined by a duration of time from the start of the engine 14 but may be determined by a coolant temperature or the oil temperature of the engine 14 or a combination of those.

In the above description, 0° C. is raised as the freezing point, that is, a congealing point of water. However, the present invention is not limited thereto. In the case where a congealing point of the moisture that is contained in the blow-by gas is any temperature other than 0° C. due to impurities or the like, the temperature other than 0° C. may be adopted as the freezing point. In addition, in the illustrated example, a horizontally-opposed engine is used as the engine 14. However, the present invention is not limited thereto. The engine 14 may be an engine of another type. Furthermore, in the above description, as the compressor 42, the compressor of the turbocharger 18 that is driven by exhaust energy of the engine 14 is used. However, the present invention is not limited thereto. A compressor of a supercharger that is driven by an output shaft of the engine 14 may be used.

In the above description, the first blow-by pipe 61 is coupled to the chain cover 16. However, the present invention is not limited thereto. The first blow-by pipe 61 may be coupled to another member that defines a space where the blow-by gas flows. For instance, the first blow-by pipe 61 may be coupled to a locker cover 81 that is attached to a side of the engine 14. That is, similar to the chain chamber 17 that is defined by the chain cover 16, a locker chamber 82 that is defined by the locker cover 81 is a space that communicates with the crank chamber 65 and where the blow-by gas flows. Needless to say, the first blow-by pipe 61 may be coupled to the cylinder blocks 20, 21. Just as described, any of the crank chamber 65, the chain chamber 17, and the locker chamber 82 is the space that constitutes the inside of the engine 14 and is also the space where the blow-by gas flows.

The invention claimed is:

1. A blow-by gas supply device for an engine, the engine including a compressor that is configured to compress intake air, the blow-by gas supply device being configured to be provided in the engine and to recirculate blow-by gas to an upstream side of the compressor, the blow-by gas supply device comprising:
    an upstream-side passage configured to be coupled to an input port of the compressor and guide the intake air to be suctioned into the input port;
    a downstream-side passage configured to be coupled to an output port of the compressor and guide the intake air discharged from the output port;
    a gas passage coupled to the upstream-side passage and configured to guide the blow-by gas from inside the engine to the upstream-side passage;
    a bypass passage coupled to the upstream-side passage and the downstream-side passage and configured to guide the intake air from the downstream side passage to the upstream side passage;
    a valve mechanism provided in the bypass passage and configured to be switched between a communication state where the intake air is guided from the downstream-side passage to the upstream-side passage and a cutoff state where the intake air flowing from the downstream-side passage to the upstream-side passage is cut off; and
    a valve control unit configured to control the valve mechanism in the communication state when an external temperature is equal to or lower than a freezing point, and control the valve mechanism in the cutoff state when the external temperature exceeds the freezing point, wherein the external temperature is a temperature of the intake air upstream of the input port and wherein the valve control unit is configured to control the valve mechanism in the cutoff state from a start of the engine to a lapse of a first period even when the external temperature is equal to or lower than the freezing point.

2. The blow-by gas supply device for the engine according to claim 1, wherein
    the valve control unit is configured to control the valve mechanism in the cutoff state after a lapse of a second period from the start of the engine even when the external temperature is equal to or lower than the freezing point, the second period being longer than the first period.

3. The blow-by gas supply device for the engine according to claim 2, wherein
the valve control unit is configured to increase a communication amount of the valve mechanism as the external temperature decreases when controlling the valve mechanism in the communication state.

4. The blow-by gas supply device for the engine according to claim 2, wherein
the valve control unit is configured to increase the communication amount of the valve mechanism as a temperature of the intake air flowing through the downstream side passage decreases when controlling the valve mechanism in the communication state.

5. The blow-by gas supply device for the engine according to claim 2, wherein
the valve control unit is configured to limit the communication amount of the valve mechanism on the basis of requested torque by a driver when controlling the valve mechanism in the communication state.

6. The blow-by gas supply device for the engine according to claim 1, wherein
the gas passage is coupled to a portion of the upstream side passage, which portion is on a downstream side of a coupled position of the bypass passage to the upstream side passage.

7. The blow-by gas supply device for the engine according to claim 6, wherein
the valve control unit is configured to increase a communication amount of the valve mechanism as the external temperature decreases when controlling the valve mechanism in the communication state.

8. The blow-by gas supply device for the engine according to claim 6, wherein
the valve control unit is configured to increase the communication amount of the valve mechanism as a temperature of the intake air flowing through the downstream side passage decreases when controlling the valve mechanism in the communication state.

9. The blow-by gas supply device for the engine according to claim 6, wherein
the valve control unit is configured to limit the communication amount of the valve mechanism on the basis of requested torque by a driver when controlling the valve mechanism in the communication state.

10. The blow-by gas supply device for the engine according to claim 1, wherein
the valve control unit is configured to increase a communication amount of the valve mechanism as the external temperature decreases when controlling the valve mechanism in the communication state.

11. The blow-by gas supply device for the engine according to claim 1, wherein
the valve control unit is configured to increase the communication amount of the valve mechanism as a temperature of the intake air flowing through the downstream side passage decreases when controlling the valve mechanism in the communication state.

12. The blow-by gas supply device for the engine according to claim 1, wherein
the valve control unit is configured to limit the communication amount of the valve mechanism on the basis of requested torque by a driver when controlling the valve mechanism in the communication state.

13. A blow-by gas supply device for an engine, the engine including a compressor that is configured to compress intake air, the blow-by gas supply device being configured to be provided in the engine and to recirculate blow-by gas to an upstream side of the compressor, the blow-by gas supply device comprising:
an upstream-side passage configured to be coupled to an input port of the compressor and guide the intake air to be suctioned into the input port;
a downstream-side passage configured to be coupled to an output port of the compressor and guide the intake air discharged from the output port;
a gas passage coupled to the upstream-side passage and configured to guide the blow-by gas from inside the engine to the upstream-side passage;
a bypass passage coupled to the upstream-side passage and the downstream-side passage and configured to guide the intake air from the downstream side passage to the upstream side passage;
a valve mechanism provided in the bypass passage and configured to be switched between a communication state where the intake air is guided from the downstream-side passage to the upstream-side passage and a cutoff state where the intake air flowing from the downstream-side passage to the upstream-side passage is cut off; and
a valve control unit configured to control the valve mechanism in the communication state when an external temperature is equal to or lower than a freezing point, and control the valve mechanism in the cutoff state when the external temperature exceeds the freezing point, wherein the external temperature is a temperature of the intake air upstream of the input port and wherein the valve control unit is configured to control the valve mechanism in the cutoff state from a start of the engine to a lapse of a first period even when the external temperature is equal to or lower than the freezing point and wherein the gas passage is coupled to a portion of the upstream side passage to the upstream side passage.

14. The blow-by gas supply device for the engine according to claim 13, wherein
the valve control unit is configured to increase a communication amount of the valve mechanism as the external temperature decreases when controlling the valve mechanism in the communication state.

15. The blow-by gas supply device for the engine according to claim 13, wherein
the valve control unit is configured to increase the communication amount of the valve mechanism as a temperature of the intake air flowing through the downstream side passage decreases when controlling the valve mechanism in the communication state.

16. The blow-by gas supply device for the engine according to claim 13, wherein
the valve control unit is configured to limit the communication amount of the valve mechanism on the basis of requested torque by a driver when controlling the valve mechanism in the communication state.

* * * * *